May 1, 1962 J. L. LOWRANCE 3,032,703
CONTROL APPARATUS
Filed Dec. 28, 1956 3 Sheets-Sheet 1

INVENTOR.
JOHN L. LOWRANCE
BY R.M.Brodahl
ATTORNEY

INVENTOR.
JOHN L. LOWRANCE
BY R.J.Brodahl
ATTORNEY

May 1, 1962  J. L. LOWRANCE  3,032,703
CONTROL APPARATUS

Filed Dec. 28, 1956  3 Sheets-Sheet 3

INVENTOR.
JOHN L. LOWRANCE
BY R.Y. Brodahl
ATTORNEY

United States Patent Office 3,032,703
Patented May 1, 1962

3,032,703
CONTROL APPARATUS
John L. Lowrance, South Bend, Ind., assignor to The Bendix Corporation, a corporation of Delaware
Filed Dec. 28, 1956, Ser. No. 631,335
4 Claims. (Cl. 323—64)

The present invention relates in general to electrical control apparatus, and more particularly to electrical control apparatus for providing a substantially constant reference voltage independent of frequency or voltage variations in an alternator power supply, which power supply may be driven by an internal combustion engine, and the reference voltage may be utilized for controlling the operation of said engine.

It is an object of the present invention to provide improved electrical control apparatus for furnishing a regulated or controlled substantially constant reference voltage.

It is another object of the present invention to provide improved electrical control apparatus for providing a substantially constant reference voltage from a power supply having variations in frequency and/or voltage value or magnitude.

It is a further object of the present invention to provide improved voltage supply apparatus operative with an alternator power supply having a variable output, with said apparatus being operative to provide a substantially constant value reference voltage.

It is a further object of the present invention to provide improved voltage supply apparatus operative with an alternator power supply having a variable output, with said apparatus being operative to provide a substantially constant value reference voltage.

It is an additional object of the present invention to provide an improved control apparatus for an internal combustion engine, which apparatus is operative to provide a substantially constant value control voltage for controlling the operation of that engine.

It is a different object of the present invention to provide an improved electrical control apparatus for an internal combustion engine, with said apparatus being operative with an alternator power supply driven by said engine for providing a substantially constant value reference voltage for controlling the operation of said engine.

These and other objects and advantages of the present invention will become apparent in view of the following description taken in conjunction with the drawings wherein.

Figure 1:
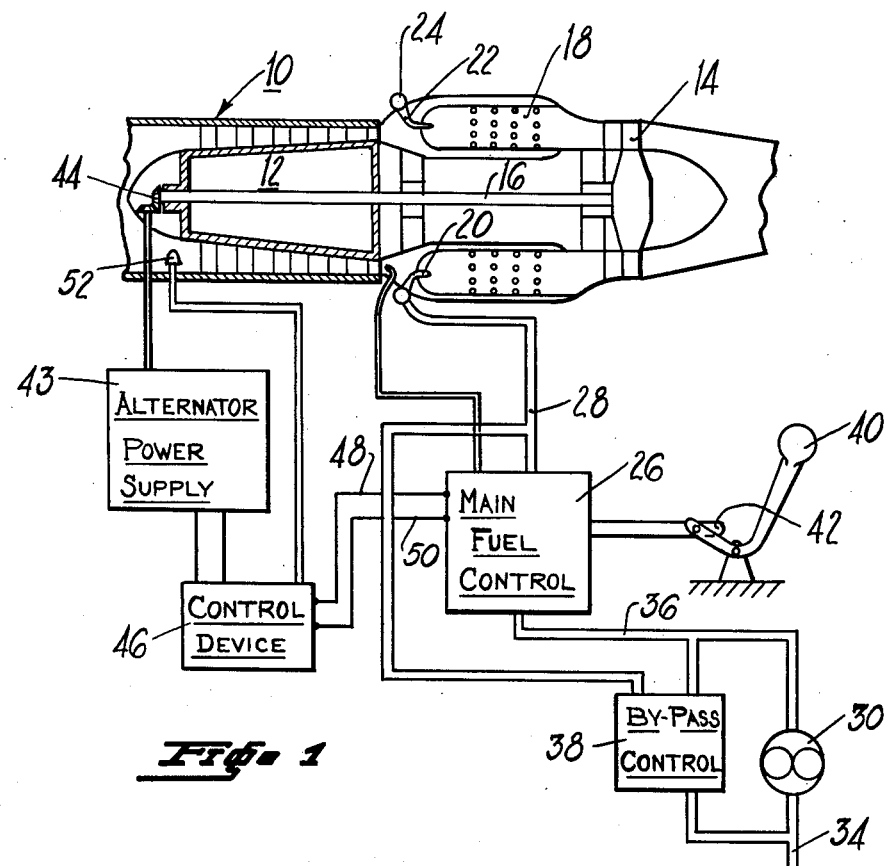
FIGURE 1 is a diagrammatic illustration of control apparatus in accordance with the present invention.

In FIGURE 1 there is shown an internal combustion engine comprising a gas turbine engine 10 having a compressor 12 and a turbine 14 interconnected by a drive shaft 16. A plurality of combustion chambers 18 are each provided with a fuel nozzle 20 supplied fuel through individual fuel lines 22 from a common fuel manifold 24. A fuel control 26 is operative through an output conduit 28 for controlling the supply of fuel to the fuel manifold 24. A fuel pump 30 receives fuel from a fuel supply 32 through an inlet conduit 34 and supplies this fuel through an outlet conduit 36 to the main fuel control 26. A conventional by-pass control 38 is operative as well known to persons skilled in this art.

A manual control throttle member 40 is operatively connected through a control arm 42 for controlling the operation of the fuel control 26. An alternator power supply 43 is driven through suitable gearing 44 by the engine 10, and is connected for providing an output voltage to a control device 46 which in turn is connected through the conductors 48 and 50 to the fuel control 26. An engine operating condition or parameter responsive device 52, is provided and may for example be responsive to inlet temperature or inlet pressure to the gas turbine engine 10, or may be shifted to a position along the gas flow path through the engine 10 to be responsive to some compressor interstage temperature or pressure, or the compressor outlet temperature or pressure, or some other pressure or temperature along the gas flow path through the engine 10 as may be desired.

Figure 2:
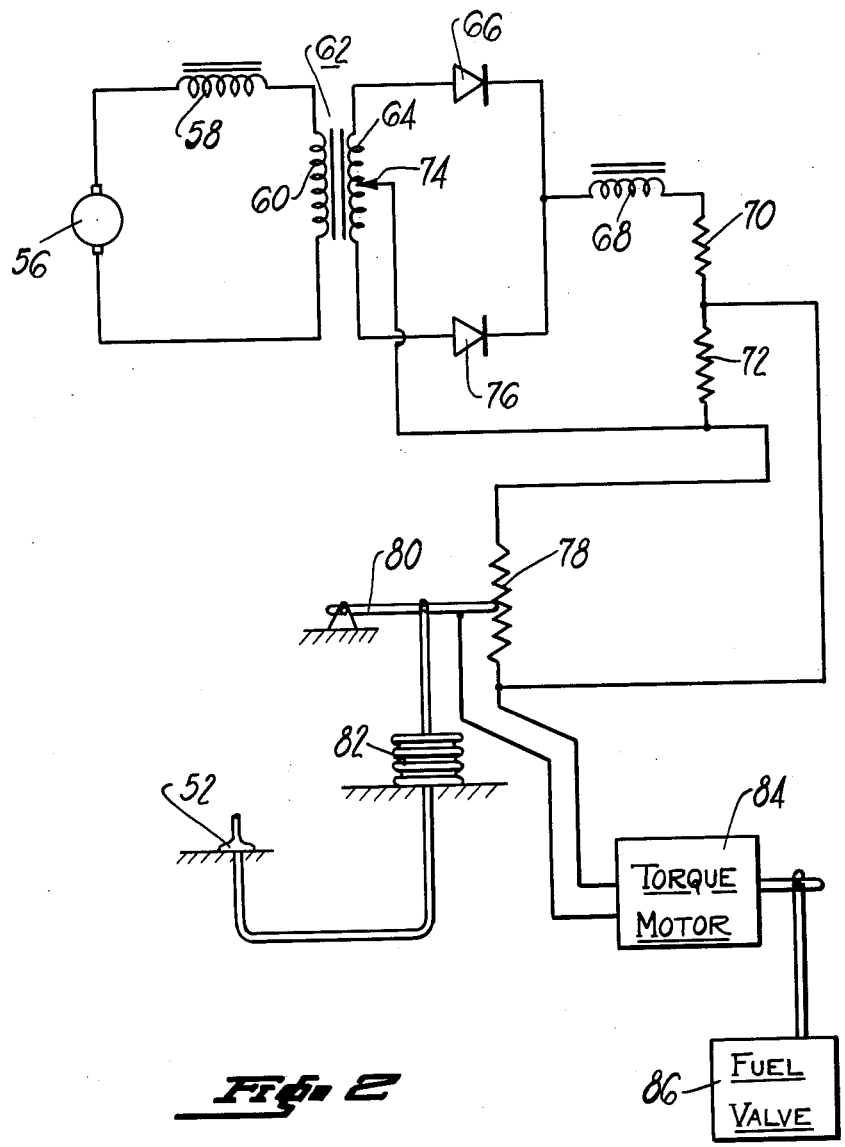
FIGURE 2 is an electrical schematic of control apparatus in accordance with the present invention.

In FIGURE 2 there is shown an alternator power supply 56 which may correspond to the power supply 43 shown in FIGURE 1. It is connected through an iron core inductor impedance member 58 to the primary winding 60 of a transformer member 62 having a secondary winding 64 which includes a center tap 74, with one end of the secondary winding being connected through a diode device or rectifier control member 66 and an iron core inductance member 68 through a pair of load resistors 70 and 72 back to the center tap connection 74 of the secondary winding 64. The opposite end of winding 64 is connected through the second diode device or rectifier control member 76 the inductance or impedance member 68 and the output resistor members 70 and 72 to the center tap connection member 74. A reference resistor member 78 is connected in parallel with the load resistance member 72, and is provided with a variable position tap member 80 which is varied in position by a bellows member 82 responsive to the pressure or temperature responsive member 52 shown in FIGURE 1. A torque motor 84 is responsive to the voltage drop across the portion of the reference resistor member 78 as determined by the position of the control tap 80. The output of the torque motor 84 may be operatively connected to a fuel valve 86 which may be a part of main fuel control 26 shown in FIGURE 1.

Figure 3:
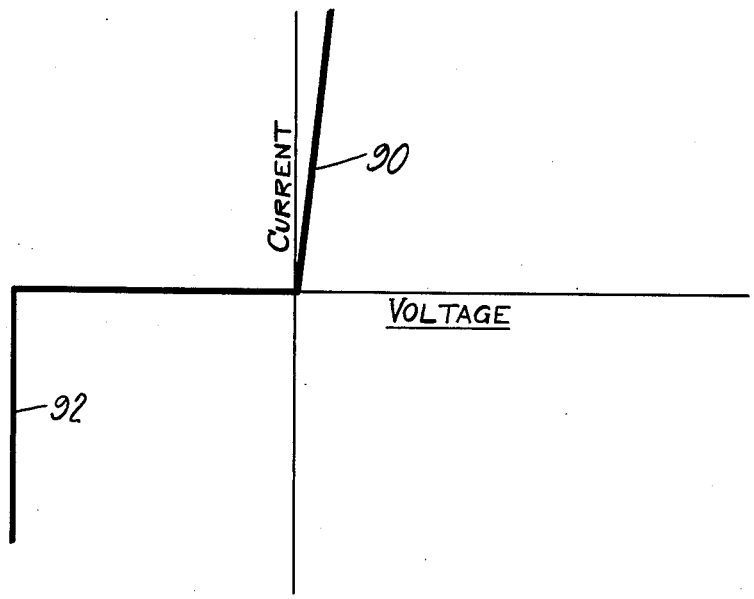
FIGURE 3 is a curve chart illustrating the operation of a portion of the control apparatus shown in FIGURE 2.

In FIGURE 3 there is shown a curve chart illustrating the well known operation of the Zener rectifier devices or reference diode control members 66 and 76 shown in FIGURE 2. The latter rectifier or reference diode control members 66 and 76 are conductive in a forward direction as illustrated by portion 90 of the curve shown in FIGURE 3. In the reverse direction the control devices are conductive as illustrated by the curve portion 92 such that they are operative as Zener diodes for providing a reference voltage as determined by the reverse conductivity curve portion 92.

Figure 4:
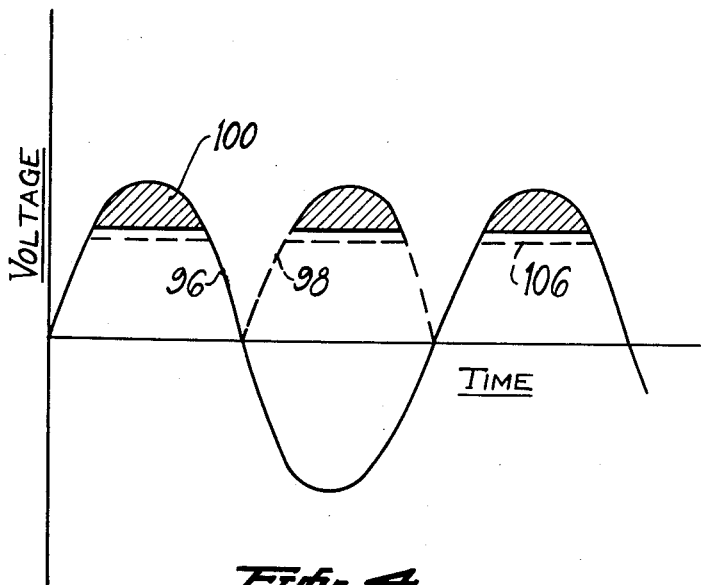
FIGURE 4 is a curve chart illustrating the operation of control apparatus shown in FIGURE 2.

In FIGURE 4 there is a curve chart illustrating the operation of the two control devices 66 and 76 as effectively a full wave rectifier operative with the initial sinusoidal alternator voltage supplied by the alternator 56 shown in FIGURE 2 and illustrated by the curve 96.

Due to the operation of the control devices 66 and 76, as respectively a full wave rectifying circuit, the first half cycle of the alternator voltage wave 96 is respectively provided as the voltage wave form 98 up to a predetermined reference level 100 which corresponds to the reverse conductivity voltage of the diodes or control devices 66 and 76. The control devices are conductive in the reverse direction such that the cross-hatched portion of wave 98 above the predetermined voltage value 100 is not available to the output impedance members 70 and 72.

Figure 5:
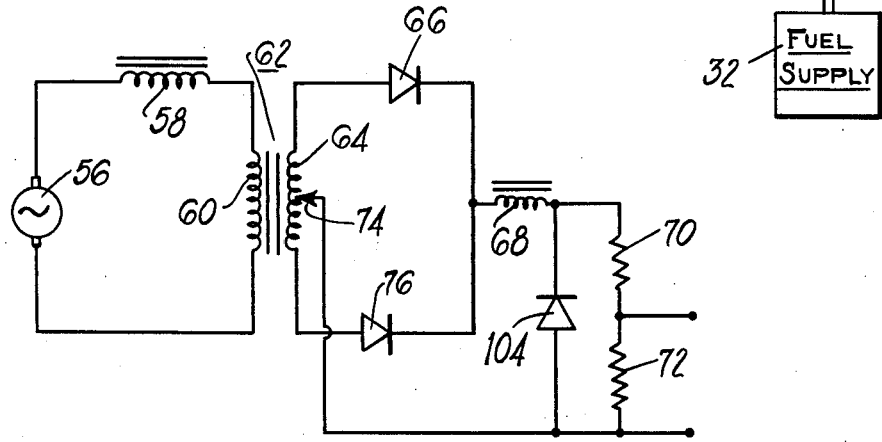
FIGURE 5 is an electrical schematic showing a modification of the control apparatus in accordance with the present invention.

In FIGURE 5 there is shown a further modification of the control apparatus in accordance with the present invention, with the circuit elements shown in FIGURE 5 which corresponds to those shown in FIGURE 2 being identified with similar numerals. An additional reference control device 104 is provided in parallel with the output members 70 and 72.

In the operation of the control apparatus in accordance with the present invention the internal combustion engine 10 is operatively connected for driving the alternator power supply 43 shown in FIGURE 1 for providing an output alternating voltage. An engine operating condition responsive member 52 is operative with the control apparatus such that there is applied through conductors 48 and 50 an electrical signal which varies as a function of engine operating conditions sensed by the control member 52 for controlling the operation of the main fuel control 26 and thereby for controlling the fuel flow to the engine 10 as a function of the engine operating condition sensed by the control member 52. The latter engine condition may be a temperature or pressure.

In the operation of the control apparatus shown in FIGURE 2 the alternator device 56 may correspond to the alternator power supply 43 shown in FIGURE 1, and is driven by the internal combustion engine 10 to be controlled. The output of the alternator member 56 has a frequency proportional to engine speed such that if the impedance member 58 is so chosen that the impedance of member 58 is considerably greater than the effective impedance of the remainder of the control circuit as reflected through the primary winding 60 into the circuit of the alternator 56, then the secondary winding 64 of the transformer 62 is effectively a constant current source in accordance with the following formulas:

$$V = k(f) = iX_L + iR = i(2\pi f)L + iR$$

if $$R << (2\pi f)L$$
$$k(f) \cong i(2\pi f)L$$
$$k \cong i2\pi L$$

$$i \cong \frac{K}{2\pi L}$$

The control devices 66 and 76 are operative for the dual purpose of operation as unidirectional conductive or rectifier devices below a predetermined reference level of the output voltage received from the secondary winding 64 and in addition as Zener reference diodes by conducting in the reverse direction on the respective reverse half cycles of the output voltage received from the secondary winding 64 for voltages above the predetermined reference level as determined by the reverse direction conductivity or Zener voltage of the control devices 66 and 76. This is illustrated by the curve charts shown in FIGURE 3 and FIGURE 4. In FIGURE 4 the above reference voltage level corresponds to the level 100, such that when the upper end of the secondary winding 64 as illustrated in FIGURE 2 is positive and the lower end of the secondary winding 64 is negative, the current will flow in the forward direction through the control device 66 and will not flow through the control device 76 toward the negative polarity lower end of the secondary winding 64, during that portion of the positive half cycle of the alternating voltage wave form received from the secondary winding 64 until the voltage level reaches the predetermined voltage level 100 as illustrated in FIGURE 4. For voltage values above the predetermined level 100 the control device 76 becomes conductive in the reverse direction such that the portion of each positive half cycle as illustrated in FIGURE 4 passes through the control device 76 back to the negative terminal 74 of the secondary winding 64 and not through the impedance member 68 and the output impedance member 72. For voltage values below said predetermined reference level, the current is conductive through the control device 66 and not through the control device 76, then through the impedance member 68 and the output impedance members 70 and 72 and back to the center tap 74 on the secondary winding 60.

For the negative half cycle of the wave form 96 shown in FIGURE 4 when the lower end of secondary winding 64 is at positive polarity and the upper end of the secondary winding 64 is at negative polarity, the control device 76 is conductive for the whole half cycle and the control device 66 is not conductive for the portion of the half cycle below the reference voltage level 100 illustrated in FIGURE 4 and is conductive for the portion of the half cycle above the reference voltage level 100. Due to the filtering effect of the impedance member 68 there results a substantially constant direct current voltage across the output impedance member 72, and since the reference impedance member 78 is connected in parallel with the output impedance member 72, it receives a substantially constant reference voltage across it.

The bellows member 82 shown in FIGURE 2 is operative in response to an engine operating condition or parameter as sensed by the control member 52 for determining the position of potentiometer arm 80. This controls the voltage signal applied to the torque motor 84 for controlling the operation of the fuel valve 86 and thereby for controlling the fuel flow supplied to the engine 10 as a function of the engine operating condition or parameter sensed by the control member 52.

In the operation of the control apparatus shown in FIGURE 5, the uni-directional conductive and reference diode member 104 is operative to effectively short circuit the impedance members 70 and 72 when the voltage applied across them goes above a reference level established by the Zener diode 104. Referring to the wave form shown in the curve chart of FIGURE 4 the control member 104 is operative to provide the voltage level 106 which corresponds to a predetermined second reference level as may be established by the control device 104, if desired.

Although th present invention has been described with a certain degree of particularity, it should be understood that the present disclosure has been made only by way of example and that numerous changes in the details of construction and the combination and arrangement of parts may be resorted to without departing from the scope and spirit of the present invention.

I claim:

1. In electrical control apparatus for providing a regulated output voltage, said apparatus being operative with a source of variable frequency alternating voltage having a pair of output terminals, the combination of a first control device operatively connected to one of said terminals and being conductive away from said one terminal, a second control device operatively connected to the other of said terminals and being conductive away from said other terminal, an input impedance member having an impedance which varies as a function of the frequency of said alternating voltage and being operatively connected between said alternating voltage source and said pair of control devices, with said first and second control devices being conductive toward their respective terminals when said alternating voltage has a magnitude greater than said reference magnitude, and an output impedance member connected between said first and second control devices such that said regulated output voltage is provided across said output impedance member corresponding to said reference magnitude of said alternating voltage.

2. The electrical control apparatus of claim 1 with said input impedance member being connected in a series with each of said first and second control devices.

3. The apparatus of claim 1, in which said first and second control devices comprise Zener diode devices.

4. The apparatus of claim 1, including a third control device operatively connected across said output impedance member and operative for further regulating said output voltage as provided across said output impedance member.

References Cited in the file of this patent

UNITED STATES PATENTS

| | | |
|---|---|---|
| 1,691,909 | Crouse et al. | Nov. 13, 1928 |
| 1,883,613 | Devol | Oct. 18, 1932 |
| 2,714,702 | Shockley | Aug. 2, 1955 |
| 2,835,867 | Golden | May 20, 1958 |
| 2,854,651 | Kircher | Sept. 30, 1958 |